(12) United States Patent
Yanko

(10) Patent No.: US 7,520,119 B2
(45) Date of Patent: Apr. 21, 2009

(54) CROP LIFTING APPARATUS

(75) Inventor: Glen Alvin Anthony Yanko, Regina (CA)

(73) Assignee: Ralph McKay Industries Inc., Saskatchewan (CA)

( * ) Notice: Subject to any disclaimer, the term of this patent is extended or adjusted under 35 U.S.C. 154(b) by 0 days.

(21) Appl. No.: 11/968,490

(22) Filed: Jan. 2, 2008

(65) Prior Publication Data

US 2008/0196379 A1    Aug. 21, 2008

(30) Foreign Application Priority Data

Feb. 21, 2007    (CA) .................................. 2579398

(51) Int. Cl.
*A01D 34/00* (2006.01)

(52) U.S. Cl. ....................................................... 56/312

(58) Field of Classification Search .................. 56/312, 56/313, 298, 307, 318, 308, 310
See application file for complete search history.

(56) References Cited

U.S. PATENT DOCUMENTS

| | | | | |
|---|---|---|---|---|
| 1,231,690 A | * | 7/1917 | Anderson | ..................... 56/313 |
| 1,815,491 A | * | 7/1931 | Braasch et al. | ................. 56/312 |
| 1,862,775 A | * | 6/1932 | Thoen | ......................... 56/313 |
| 2,187,438 A | * | 1/1940 | Wilcox | ......................... 56/313 |
| 2,394,838 A | * | 2/1946 | Beltz | ............................. 56/312 |
| 2,576,122 A | * | 11/1951 | Kenison | ....................... 56/312 |
| 2,577,324 A | * | 12/1951 | Goesch | ......................... 56/312 |
| 2,734,332 A | * | 2/1956 | Fisher | .......................... 56/312 |
| 2,892,298 A | * | 6/1959 | Chaney | ......................... 56/314 |
| 2,960,814 A | * | 11/1960 | Babcock | ....................... 56/312 |
| 3,163,975 A | * | 1/1965 | Lightsey | ....................... 56/313 |
| 3,579,967 A | * | 5/1971 | Schumacher | ................. 56/313 |
| 3,633,350 A | * | 1/1972 | Schumacher | ................. 56/313 |
| 3,742,690 A | | 7/1973 | Schumacher, II et al. | |
| 3,788,051 A | * | 1/1974 | Richardson | ................... 56/318 |
| 3,834,139 A | * | 9/1974 | Schumacher et al. | .......... 56/313 |
| 3,913,306 A | * | 10/1975 | Schumacher et al. | .......... 56/313 |
| 3,965,659 A | * | 6/1976 | Schumacher et al. | .......... 56/313 |
| 4,120,138 A | | 10/1978 | Schumacher, II et al. | |
| 5,943,849 A | * | 8/1999 | Billheimer | .................... 56/119 |
| 6,244,026 B1 | * | 6/2001 | Minnihan et al. | ............. 56/119 |
| 6,442,919 B1 | * | 9/2002 | Schumacher et al. | .......... 56/307 |
| 6,655,120 B2 | | 12/2003 | Schumacher et al. | |
| 6,691,499 B2 | * | 2/2004 | Schumacher et al. | .......... 56/312 |
| 6,708,477 B2 | * | 3/2004 | Schumacher et al. | .......... 56/307 |

* cited by examiner

*Primary Examiner*—Árpád Fábián-Kovács
(74) *Attorney, Agent, or Firm*—King & Schickli, PLLC

(57) ABSTRACT

A flexing crop lifter apparatus includes a finger recess portion configured to receive a forward end of a guard finger, and a securing portion is adapted for attachment to the cutting header. A ski mounting plate extends rearward and downward from the finger recess portion under an attached guard finger. A ski member is attached at a rear end thereof to a rear end of the ski mounting plate and extends forward under the ski mounting plate and curves upward at a front end thereof. A lifting arm extends rearward from the front end of the ski member back and over a knife of the cutting header when the apparatus is attached to the guard finger. The ski member and the ski mounting plate are configured to flex.

8 Claims, 1 Drawing Sheet

CROP LIFTING APPARATUS

This invention relates to agricultural harvesting implements and in particular to implements for cutting crop plants for harvesting.

BACKGROUND

Growing crops such as grains, beans, hay, and the like are cut at harvest using a cutting header. Typically the knife on a cutting header comprises a knife bar extending along the front lower edge of the header, with triangular knife sections extending forward from the bar. The exposed side edges of the knife sections are sharpened and move laterally back and forth, cooperating with guards attached to the front lower edge of the header to slice the crop stems.

The guards comprise pointed guard fingers extending forward, and the knife moves back and forth along the edge of the header in a slot cut laterally through the guard fingers. In addition to cooperating with the knife to cut the crop, the guards serve to protect the knife sections from breakage when contacting stones and like obstructions.

Crops sometimes are lying close to the ground making them difficult to cut. Some plants are inherently short, while others may fall down when they reach maturity, or be pushed down by heavy rain or hail.

The knife of a conventional cutting header is a few inches above the ground when the header is in its lowest position, such that very short or downed crop material will pass under the knife and be lost. Crop lifters of various kinds have been developed that are attached to the header and provide a ski member that extends forward from the knife and rides along the ground ahead of the knife, following the ground and moving up and down relative to the knife as the orientation of the header with respect to the ground varies with field contours. A lifting arm extends rearward at a shallow angle from the front of the ski member back and over the knife. The front end of the ski member slides under the crop stems and lifts them up and they then slide rearward along the top of the lifting arm and over the knife to be cut and fall onto the header.

In one type of crop lifter the ski member that rides on the ground is pivotally attached to the header so as to be able to move up and down to follow the ground. In another common type of crop lifter the ski member is fixed to the header instead of pivoting, but is made of spring steel so that same may flex to move up and down to follow the ground. The crop lifters are attached to the header, often via the guard fingers, by a wide variety of mechanisms, many of which provide a "quick attach" feature that allows the lifter to be removed and replaced quickly.

The pivoting crop lifters are somewhat more complicated and expensive, since they include parts that pivot with respect to each other. The flexing lifters are simple, comprising one of the variety of mechanisms for attaching them to the header, and then a springy ski member extending forward along the ground, and a lifting arm extending rearward and upward from the front end of the ski member.

Flexing spring steel crop lifters are disclosed for example in U.S. Pat. Nos. 3,742,690 and 4,120,138 to Schumacher II et al., and 6,655,120 to Schumacher et al. As can be seen, the ski member is attached to the point of the guard finger and the flexing portion extends forward from the point of the guard finger. Thus the ski member must extend far enough forward to provide a sufficient length from the point of the guard to the front end of the ski member to allow the ski member to flex through the required range of movement. Consequently the prior art flexing crop lifters extend a significant distance forward of the guard fingers. Thus the lifters are subject to damage when passing through dips or ditches in the field, and during turns they move laterally through the crop, such that crop stems can be pushed over and away from the knife, and thus be lost.

SUMMARY OF THE INVENTION

It is an object of the present invention to provide a crop lifting apparatus that overcomes problems in the prior art.

The present invention provides a flexing crop lifter apparatus adapted for attachment to a guard finger of a guard attached to a cutting header. The apparatus comprises a finger recess portion configured to receive a forward end of a guard finger in finger recess defined by the finger recess portion when the finger recess portion is moved rearward. A securing portion is adapted for attachment to the cutting header to secure the apparatus to the cutting header. A ski mounting plate extends rearward and downward from the finger recess portion under an attached guard finger. A ski member is attached at a rear end thereof to a rear end of the ski mounting plate and extends forward under the ski mounting plate and curves upward at a front end thereof. A lifting arm extends rearward from the front end of the ski member back and over a knife of the cutting header when the apparatus is attached to the guard finger. The ski member and the ski mounting plate are configured to flex.

Thus the flexing crop lifter of the present invention attaches to the point of the guard finger but the flexing portion does not extend forward from the point of the guard finger. Instead a ski mounting plate extends rearward and downward from the point of the guard finger under the guard finger, and the ski member of the crop lifter is attached at a rear end thereof to a rear end of the ski mounting plate, located under the knife. The ski member extends forward under the ski mounting plate and under the guard finger, and curves up at the front end thereof. A lifting arm extends rearward at a shallow angle from the front end of the ski member back and over the knife. The ski member and the rearward extending ski mounting plate both flex and combine to provide the required range of flexing.

As in conventional flexing crop lifters sufficient length is provided from the rear end of the ski mounting plate, where the rear end of the ski member is attached, to the front end of the ski member to allow the ski member, in combination with the flex provided by the ski mounting plate, to flex through the required range of movement. Since the rear portion of the ski member is under the guard finger, rearward of the point of the guard finger, and since the ski mounting member also flexes, the front end of the ski member is located much closer to the point of the guard finger than in prior art flexing crop lifters. The ski member extends a reduced distance forward of the guard finger, thus reducing the risk of damage to the crop lifter and also to the crop when making turns. The front end of the ski member can be located only slightly forward of the point of the guard finger such that, compared to operation with prior art flexing crop lifters, the operation of the cutting knife of the header is closer to the operation thereof with no crop lifters.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

DETAILED DESCRIPTION OF THE ILLUSTRATED EMBODIMENTS

Figure 1:
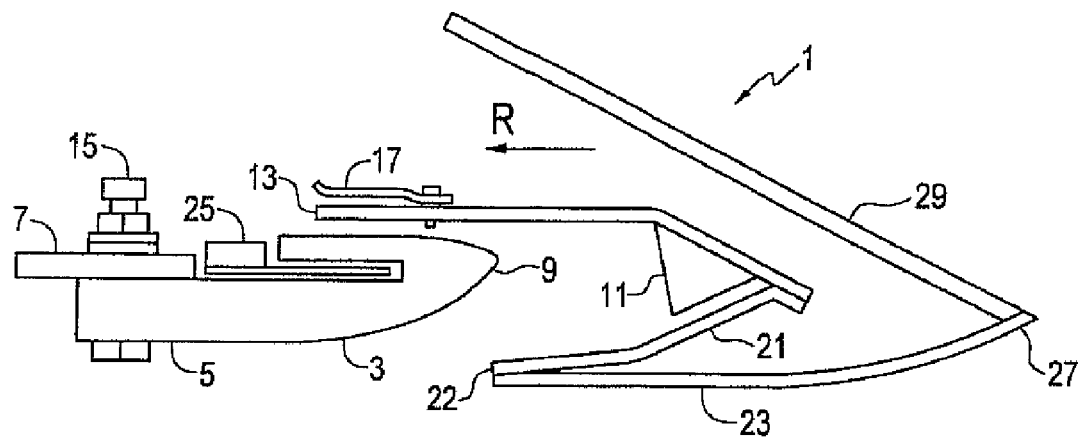
FIG. 1 is a schematic side view of an embodiment of a crop lifter apparatus of the present invention, located forward of the header to which it is to be attached.

FIG. 1 illustrates a flexing crop lifter apparatus 1 of the present invention. The crop lifter apparatus 1 is attached to a guard finger 3 of a guard 5 attached to a cutting header 7 of a harvesting implement such as a combine, mower, or the like.

The apparatus 1 comprises a finger recess portion configured to receive a forward end 9 of a guard finger 3 in finger recess 11 defined by the finger recess portion when the finger recess portion is moved rearward in direction R. A securing portion is adapted for attachment to the cutting header 7 to secure the apparatus 1 to the cutting header 7. A ski mounting plate 21 extends rearward and downward from the finger recess portion under an attached guard finger 3. A ski member 23 is attached at a rear end thereof to a rear end 22 of the ski mounting plate 21 and extends forward under the ski mounting plate 21 and curves upward at a front end thereof. A lifting arm 29 extends rearward from the front end of the ski member 23 back and over a knife 25 of the cutting header 7 when the apparatus 1 is attached to the guard finger 3. The ski member 23 and the ski mounting plate 21 are configured to flex. The ski mounting plate 21 and ski member 23 are conveniently made of flexing spring steel for example.

The apparatus 1 is moved rearward in direction R such that the point 9 of the guard finger 3 enters the finger recess 11. The securing portion is provided by a lifter attachment plate 13 that is slotted and slides rearward so that the guard bolt 15 enters the slot and the latch 17 engages the guard bolt 15 to secure the guard 5 to the header 7. The illustrated crop lifter attaching mechanism is an example of a quick attach mechanism for attaching crop lifters to a cutting header.

Figure 2:
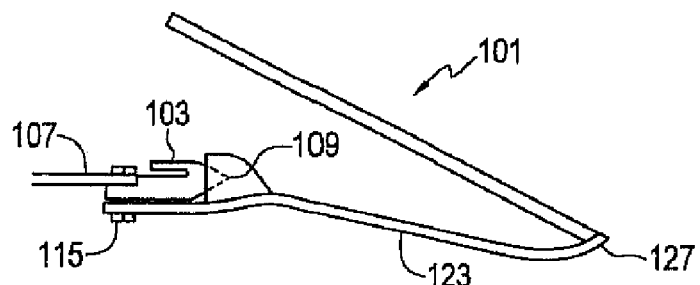
FIG. 2 is a schematic side view of a prior art crop lifter apparatus attached to a header.

A prior art crop lifter 101 mounted to the point 109 of a guard finger 103 is shown in FIG. 2. It can be seen that the flexing portion extends forward from the point 109 of the guard finger 103. The portion of the crop lifter 101 located between the point 109 of the guard finger and the guard bolt 115 attaching the crop lifter apparatus 101 to the header 107 is attached to both the guard finger 103 and the guard bolt 115, and thus cannot flex. Thus the full length of the flexing portion of the crop lifter apparatus 101, the ski member 123, extends forward from the point 109 of the guard finger a distance sufficient to allow the front end 127 of the ski member 123 to flex through the required range of movement.

It can be seen that the present invention provides a crop lifter apparatus 1 that attaches to the point 9 of the guard finger 3, but the flexing portion of the crop lifter apparatus 1 of the invention does not all extend forward from the point 9 of the guard 3. The flexing portion of the crop lifter apparatus 1 can include not only the ski member 23, but also the ski mounting plate 21, which will flex somewhat as well relative to the portion defining the finger recess 11, which is substantially fixed relative to the finger 3. The range of motion of the ski mounting plate 21 is limited since it will contact the bottom of the finger 3, but some flex is available, especially where the ski mounting plate is also made from spring steel.

As in conventional flexing crop lifters, such as apparatus 101 of FIG. 2, sufficient length is provided from the rear end 22 of the ski mounting plate 21, where the rear end of the ski member 23 is attached, to the front end 27 of the ski member to allow the front end 27 of the ski member 23 to flex through the required range of movement. The length required is reduced somewhat compared to the prior art crop lifter apparatus 101 because of the added flex provided by the ski mounting plate 21.

Since the rear portion of the ski member 21 is under the guard finger 3, rearward of the point 9 of the guard finger 3, the front end 27 of the ski member 23 is located much closer to the point 9 of the guard finger 3 than in prior art flexing crop lifters such as that illustrated in FIG. 2. The ski member 21 extends a reduced distance forward of the guard finger 3, thus reducing damage to the crop lifter apparatus 1 and to the crop in which it is working.

Figure 3:
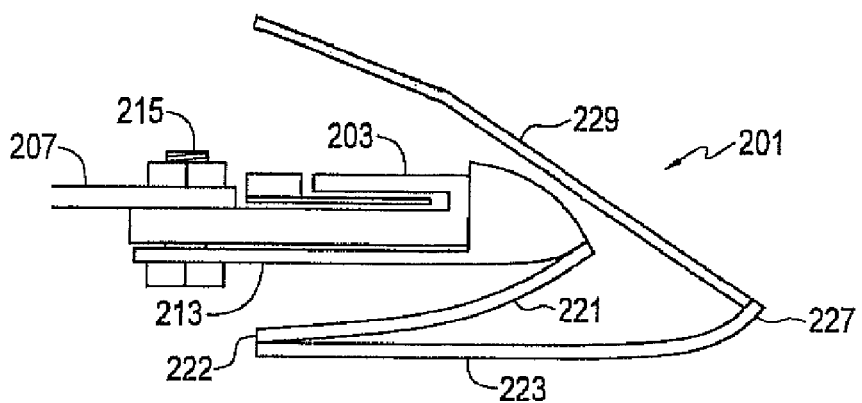
FIG. 3 is a schematic side view of an alternate embodiment of a crop lifter apparatus of the present invention attached to a header.

FIG. 3 illustrates an alternate embodiment of the crop lifter apparatus 201 of the invention where the guard finger 203 is inserted into the finger recess 211, the apparatus 201 is attached to the header 207 by passing the guard bolt 215 through the lifter attachment plate 213, which in this embodiment is located under the header 207, as opposed to the embodiment of FIG. 1 where the lifter attachment plate 13 is above the header 7. As in the embodiment of FIG. 1, a ski mounting plate 221 extends rearward and downward from the point of the finger recess 211, such that when mounted on the guard finger 203, the ski mounting plate 221 extends rearward under the guard finger 203, and the flexing spring steel ski member 223 of the crop lifter apparatus 201 is attached at a rear end thereof to a rear end 222 of the ski mounting plate 221, located under the knife 225. The flexing ski member 223 extends forward under the ski mounting plate 221 and under the guard finger 203, and curves up at the front end 227 thereof. A lifting arm 229 extends rearward and upward at a shallow angle from the front end 227 of the ski member 223 back and over the knife 225.

Thus the crop lifter apparatuses 1 and 201 provide an economical flexing spring steel crop lifter that extends a reduced distance forward of the header, improving operational performance over the prior art crop lifter apparatus 101 illustrated in FIG. 2, and like prior art crop lifters.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. A flexing crop lifter apparatus adapted for attachment to a guard finger of a guard attached to a cutting header, the apparatus comprising:

a finger recess portion configured to receive a forward end of a guard finger in a finger recess defined by the finger recess portion when the finger recess portion is moved rearward;

a securing portion adapted for attachment to the cutting header to secure the apparatus to the cutting header;

a ski mounting plate extending rearward and downward from the finger recess portion under an attached guard finger;

a ski member having a bottom surface configured to ride along a ground surface, the ski member attached only at a rear end thereof to a rear end of the ski mounting plate and extending forward under the ski mounting plate and curving upward at a front end thereof;

a lifting arm extending rearward from the front end of the ski member back and over a knife of the cutting header when the apparatus is attached to the guard finger;

wherein the ski member and the ski mounting plate are configured to flex up and down with respect to the finger recess portion.

2. The apparatus of claim 1 wherein the securing portion comprises a securing arm extending rearward from the recess portion and adapted at a rear end thereof for attachment to the cutting header.

3. The apparatus of claim 2 wherein the guards are attached to the cutting header by guard bolts, and wherein the securing arm extends under a guard finger when attached, and the securing arm is adapted at the rear end thereof for attachment to a guard bolt under the cutting header.

4. The apparatus of claim 2 wherein the guards are attached to the cutting header by guard bolts, and wherein the securing arm extends over a guard finger when attached, and the securing arm is adapted at the rear end thereof for attachment to a guard bolt above the cutting header.

5. A flexing crop lifter apparatus adapted for attachment to a guard finger of a guard attached to a cutting header, the apparatus comprising:

a finger recess portion configured to receive a forward end of a guard finger in a finger recess defined by the finger recess portion when the finger recess portion is moved rearward;

a securing portion adapted for attachment to the cutting header to secure the apparatus to the cutting header;

a ski mounting plate extending rearward and downward from the finger recess portion under an attached guard finger;

a ski member having a bottom surface configured to ride along a ground surface, the ski member attached only at a rear end thereof to a rear end of the ski mounting plate and extending forward under the ski mounting plate and curving upward at a front end thereof such that the ski member can flex up and down with respect to the finger recess portion; and a lifting arm extending rearward from the front end of the ski member back and over a knife of the cutting header when the apparatus is attached to the guard finger.

6. The apparatus of claim 5 wherein the securing portion comprises a securing arm extending rearward from the recess portion and adapted at a rear end thereof for attachment to the cutting header.

7. The apparatus of claim 6 wherein the guards are attached to the cutting header by guard bolts, and wherein the securing arm extends under a guard finger when attached, and the securing arm is adapted at the rear end thereof for attachment to a guard bolt under the cuffing header.

8. The apparatus of claim 6 wherein the guards are attached to the cutting header by guard bolts, and wherein the securing arm extends over a guard finger when attached, and the securing arm is adapted at the rear end thereof for attachment to a guard bolt above the cutting header.

\* \* \* \* \*